No. 624,055. Patented May 2, 1899.
W. W. LAWRENCE.
FOUNTAIN BRUSH.
(Application filed Mar. 24, 1898.)
(No Model.)
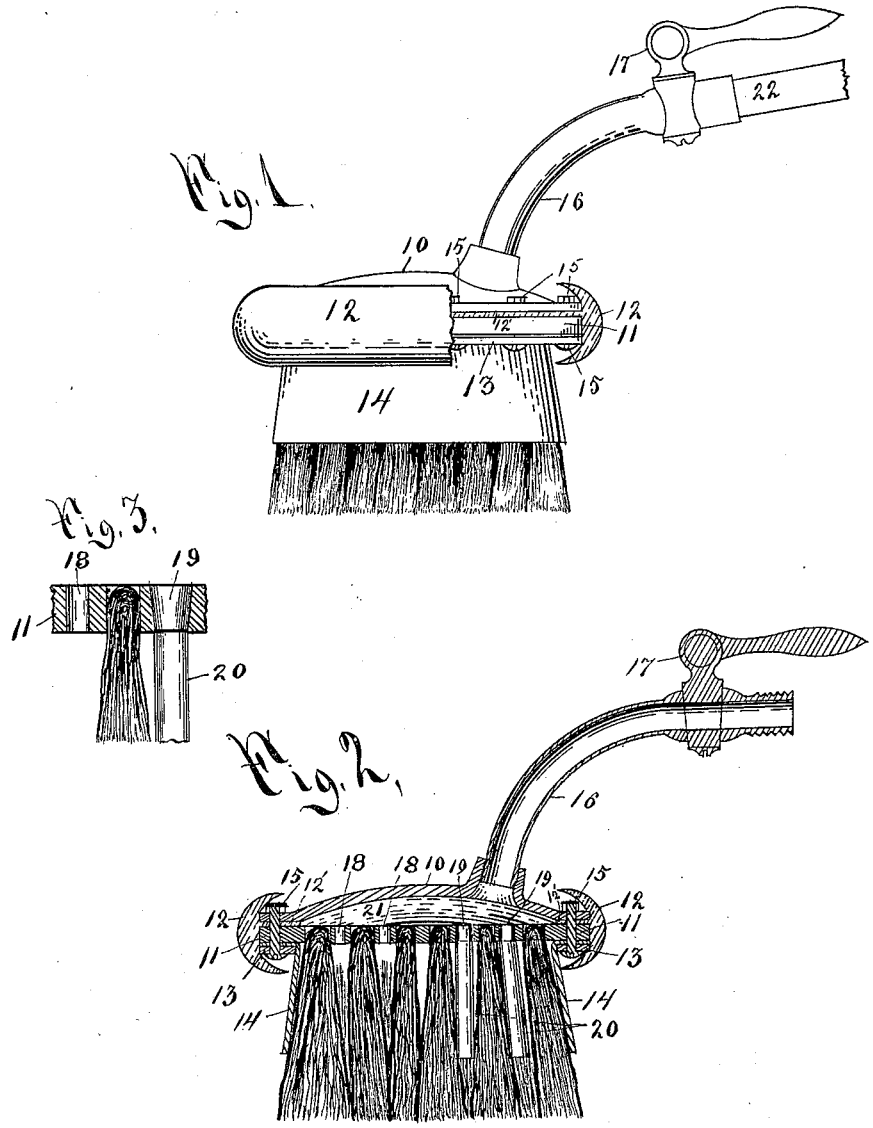

UNITED STATES PATENT OFFICE.

WILLETT W. LAWRENCE, OF GENEVA, NEW YORK.

FOUNTAIN-BRUSH.

SPECIFICATION forming part of Letters Patent No. 624,055, dated May 2, 1899.

Application filed March 24, 1898. Serial No. 675,026. (No model.)

*To all whom it may concern:*

Be it known that I, WILLETT W. LAWRENCE, a citizen of the United States, residing at Geneva, in the county of Ontario and State of New York, have invented a new and useful Improvement in Hydraulic Cleansing-Brushes, of which the following is a specification.

The object of my invention is to make a durable and convenient hydraulic brush of simple construction and designed for washing windows, railway-coaches, street-cars, &c., where the water can be applied through the handle by hydraulic pressure and which conveys the water out into the brush when the brush is raised and does not allow the water to fall away useless as soon as it passes through the brush-head. I accomplish this for most kinds of work by means of a rubber collar or gasket around the brush and extending toward the outer ends of the brush; but where it is desired to have a constant and heavy flow of water at the outer ends of the brush, as for rinsing purposes, I insert flexible tubes into the head, which extend out into the brush. I also prevent the marring of the finely-polished woodwork by the brush-head by extending a rubber gasket out in a rubber cushion which surrounds the entire brush-head, all of which will be fully understood from this specification and the accompanying drawings, in which—

Figure 1 is a side elevation of my brush with part of rubber cushion broken away.
Fig. 2 is a sectional view of my brush. Fig. 3 is a sectional view of detail of fastening for flexible tube in brush-head.

In the drawings, 10 represents the curved top of the brush-head, which I make, preferably, of aluminium on account of its light weight.

11 is the wooden part of the brush-head, having the openings for the tufts of bristles and for the water. Gasket 12' is attached to rubber cushion 12, which cushion prevents the marring of highly-polished surfaces by the brush-head.

13 is a metal ring to press the rubber gasket or collar 14 tight to the head of the brush and allow no leakage or dripping. Collar 14 keeps the supply of water well within the brush.

Parts 10, 11, 12, 12', 13, and 14 are all secured firmly in place by the screw-bolts 15
15 15, which I place around the outer edge
of the brush-head, as shown, and when so united they form the water-tight chamber 21, into which the water is introduced through pipe 16 and controlled by stop-cock 17, to which may be connected a long or short hollow handle 22, as desired, and the hose is attached to said handle, or the hose may be attached to my brush-head direct where the handle would be inconvenient on account of close quarters. Handle 22 is shown broken off.

I find openings like 18 18 sufficient with the rubber collar for many kinds of work; but if it is desired to have plenty of water at the outer ends of the brush I insert the flexible tubes 20 20, which tubes are fastened in the brush-head by means of the metal rings 19 19, which are made slightly on a taper, as shown in Fig. 3, and are driven tight within the ends of the tubes and hold them fast against the wood of the brush-head. These openings for water are made between the openings for the tufts of bristles and may be regulated in number according to the amount of water desired. The tufts of bristles are fastened in the brush-head in the usual manner.

Having fully described my invention, what I claim as new, and desire to secure by Letters Patent, is—

1. In hydraulic cleansing-brushes, a hollow handle with stop-cock therein and a chamber in the brush-head to convey liquid under hydraulic pressure to the brush, a brush-head provided with tufts of bristles, and openings for the liquid between said tufts, a flexible collar or gasket around the brush to prevent dripping, a rubber cushion around the metal brush-head to prevent marring, substantially as shown and described.

2. In hydraulic cleansing-brushes, the combination of a hollow handle with stop-cock therein, and a chamber in brush-head to convey liquid under hydraulic pressure to the brush, a brush-head with tufts of bristles, and openings for liquid between said tufts, flexible tubes fastened in said openings, a flexible collar or gasket around the brush to prevent dripping, a rubber cushion around the metal brush-head to prevent marring, substantially as shown and described.

3. In a hydraulic cleansing-brush, metal part of brush-head 10, wood part 11, gasket-cushion 12 12', ring 13, screw-bolts 15 15 15, pipe 16 with cock 17, handle 22, and openings 18 18 in the brush-head, in combination with flexible collar 14, and flexible tubes 20 20, to convey the water into the brush, as shown and described and for the purpose set forth.

In witness that I claim the foregoing I have hereunto set my hand in the presence of two witnesses.

WILLETT W. LAWRENCE.

In presence of—
  JOHN H. RIGBY,
  W. SMITH O'BRIEN.